United States Patent [19]

Friello et al.

[11] Patent Number: 4,738,854

[45] Date of Patent: Apr. 19, 1988

[54] COMESTIBLE CONTAINING MOISTURE AND SHELF STORAGE STABILIZED L-ASPARTIC ACID DERIVATIVE

[75] Inventors: Dominick R. Friello, Danbury; John E. Beam, Norwalk, both of Conn.; Wayne J. Puglia, Bayville, N.Y.; Raymond L. Roy, Danbury, Conn.

[73] Assignee: Nabisco Brands, Inc., Parsippany, N.J.

[21] Appl. No.: 865,493

[22] Filed: May 20, 1986

Related U.S. Application Data

[63] Continuation of Ser. No. 677,717, Dec. 4, 1984, abandoned.

[51] Int. Cl.$^4$ .............................................. A23G 3/30
[52] U.S. Cl. .................................. 426/3; 426/548; 426/804
[58] Field of Search ............................. 426/3-6, 426/548, 804

[56] References Cited

U.S. PATENT DOCUMENTS

| | | |
|---|---|---|
| Re. 29,682 | 6/1978 | Cella et al. |
| 3,492,131 | 1/1970 | Schlatter |
| 3,642,491 | 2/1972 | Schlatter |
| 3,695,898 | 10/1972 | Hill et al. |
| 3,761,288 | 9/1973 | Glicksman |
| 3,780,189 | 12/1973 | Scott |
| 3,928,633 | 12/1975 | Shoaf et al. |
| 4,001,456 | 1/1977 | Glicksman et al. |
| 4,122,195 | 10/1978 | Bahoshy et al. |
| 4,139,639 | 2/1979 | Bahoshy et al. |
| 4,154,867 | 5/1979 | Aldrich et al. |
| 4,208,431 | 6/1980 | Friello et al. ............ 426/3 |
| 4,217,368 | 8/1980 | Witzel et al. ............ 426/5 |
| 4,238,475 | 12/1980 | Witzel et al. ............ 424/48 |
| 4,238,510 | 12/1980 | Cherukuri et al. ...... 426/5 |
| 4,246,286 | 1/1981 | Klose et al. ............ 426/3 |
| 4,248,894 | 2/1981 | Mackay et al. ......... 426/3 |
| 4,248,895 | 2/1981 | Stroz et al. ............ 426/3 |
| 4,250,196 | 2/1981 | Friello .................. 426/5 |
| 4,271,197 | 6/1981 | Hopkins et al. ........ 426/3 |
| 4,271,199 | 6/1981 | Cherukuri et al. ...... 426/5 |
| 4,301,178 | 11/1981 | Witzel et al. ............ 426/5 |
| 4,317,838 | 3/1982 | Cherukuri et al. ...... 426/5 |
| 4,323,588 | 4/1982 | Vink et al. ............ 426/564 |
| 4,328,249 | 4/1982 | Mackay et al. ......... 426/3 |
| 4,374,858 | 2/1983 | Glass et al. ............ 426/5 |
| 4,378,374 | 3/1983 | Reggio et al. .......... 426/3 |
| 4,384,004 | 5/1983 | Cea et al. .............. 426/3 |
| 4,384,005 | 5/1983 | McSweeney .......... 426/250 |
| 4,556,565 | 12/1985 | Arima .................. 426/3 |

FOREIGN PATENT DOCUMENTS 102032  3/1984  European Pat. Off. ............ 426/548

*Primary Examiner*—Jeanette Hunter
*Attorney, Agent, or Firm*—Richard Kornutik

[57] ABSTRACT

Comestible compositions such as chewing gum containing freely dispersed L-aspartic acid sweetening agent derivative, moisture, and optionally, a manufacturing heat history of at least 115° F., are rendered storage stable relative to the retention of recoverable levels of the L-aspartic acid derivative by adding freely dispersed hydrogenated starch hydrolysate thereto, thereby allowing for the effective use of relatively low levels of such L-aspartic acid derivative therein.

48 Claims, No Drawings

COMESTIBLE CONTAINING MOISTURE AND SHELF STORAGE STABILIZED L-ASPARTIC ACID DERIVATIVE

This application is a continuation of Ser. No. 677,717 filed Dec. 4, 1984, now abandoned.

BACKGROUND OF THE INVENTION

1. Field of the Invention

The present invention relates to comestible products which have been sweetened in whole or in part with L-aspartic acid derivative sweetening agents, in the presence of moisture, and more particularly to such comestible products wherein the L-aspartic acid derivatives are stabilized against decomposition during storage.

2. Description of the Prior Art

Aspartame (L-aspartyl-L-phenylalanine methyl ester) is the preferred L-aspartic acid derivative for the purposes of the present invention, and the description of the prior art, and of the present invention, will be discussed primarily based on the use of aspartame, with the understanding that the use of the other L-aspartic acid derivatives listed below is considered to the within the scope of the present invention.

Although aspartame is known to be useful as an intense or concentrated sweetening agent in various types of comestible products, its use in such products has been seriously hampered where such comestible products contain moisture, and/or where such products are manufactured in such a way as to expose the aspartame to an adverse heat history.

It is believed that the presence of water in the products and/or such heat histories leads to the rapid decomposition of the aspartame into components such as diketopiperazine which do not provide for, or detract from, the desired sweetening effect. See for example in this regard U.S. Pat. No. 4,122,195, 4,139,639, 4,384,004, and Food Engineering, B. E. Homler, May 1984, pages 127–128.

In an effort to overcome this potential decomposition problem, when using aspartame in comestible products, various solutions to the problem have been proposed. One solution is to endeavor to make the comestible products under anhydrous conditions. See in this regard, for example, International Patent Application No. W084/01693.

This procedure, of course, requires the use of stringent processing conditions in order to minimize the chances of adding moisture to the product, and it also results in severe restrictions with respect to the types and forms of raw materials that may be used. That is, it precludes the use of aqueous forms of materials such as aqueous sorbitol solutions that have been used in such comestible products with sweetening agents other than aspartame.

Another solution to the decomposition problem is to endeavor to use the aspartame in the presence of moisture but in a manner which keeps the aspartame separate and apart from the moisture. This may be done by either using the aspartame on the exterior of the comestible product, as a coating, for example, see in this regard U.S. Pat. No. 4,374,858, or by using the aspartame within the interior or bulk of the comestible product but in an encapsulated, separated, or admixed form which precludes having a significant, if any, amount of the aspartame from coming into contact with the moisture and/or an adverse heat history during the manufacture and storage of the comestible product and prior to its being ingested by the user thereof. See in this regard, for example, U.S. Pat. Nos. Re 29,682; 3,928,633; 4,122,195; 4,139,639 and 4,384,004 and Japanese Patent Application Publication No. J-58-175470, published Oct. 14, 1983 (based on Japanese Patent Application No. 57-57680 filed Apr. 7, 1982) and Japanese Patent Application Publication No. J-58-190354, published Nov. 7, 1983 (based on Japanese Patent Application No. J-57-71892 filed Apr. 28, 1982).

This latter solution to the problem, of course, requires the expenditure of significant amounts of effort and expense in pretreating the aspartame in order to effectuate the desired long term separation of the aspartame from the moisture in, and/or heat history of, the product. The encapsulating agents or other means used to effectuate this separation must also be physically and organoleptically compatible with the formulation and utility of the comestible products in which they are used.

Further, in many, if not all cases, in order to compensate for the potential loss of the aspartame during storage, even when used in conjunction with one or more of the above noted prior art solutions to the decomposition problem, it is apparently still necessary to use the aspartame at relatively high concentration levels.

Prior to the present invention, therefore, it has not been thought readily possible to provide for the use of freely dispersed aspartame, and particularly at relatively low levels thereof, in a comestible product having a relatively high moisture content and with an adverse heat history without encountering a loss of most, if not all, of its sweetening effect due to the relatively rapid decomposition of the aspartame during the storage of the comestible product under the commonly encountered shelf life conditions for such product.

An object of the present invention, therefore, is to provide a means for stabilizing aspartame against decomposition during the long term storage of comestible products containing moisture and freely dispersed aspartame, and having a heat history normally adverse to aspartame.

SUMMARY OF THE PRESENT INVENTION

It has now been found, according to the present invention, that aspartame, when employed freely dispersed, and in relatively low concentrations, in a comestible product containing destabilizing amounts of moisture and, optionally, having a manufacturing heat history of 115° to 130° F. for at least 10 to 20 minutes, can be stabilized against decomposition so as to allow for the recovery of at least 70 to 80%, and preferably at least 80 to 90%, of the initially formulated amount of aspartame after the comestible product has been stored for long periods of time if the comestible product is also formulated with stabilizing amounts of hydrogenated starch hydrolysate.

DESCRIPTION OF THE PREFERRED EMBODIMENT

The hydrogenated starch hydrolysate which may be used in the compositions of the present invention may be a hydrogenated corn syrup or hydrogenated starch hydrolysates of varying dextrose equivalents (DE), such as are disclosed in U.S. Pat. No. Re. No. 26,959 and U.S. Pat. Nos. 3,556,811, 4,279,931 and 4,382,962, as well as various hydrogenated glucose syrups and/or reconstituted powders which contain sorbitol, hydrogenated disaccharides, tri- to hexa-hydrogenated saccharides, and hydrogenated higher polysaccharides, or mixtures of any two or more of the above.

The hydrogenated glucose syrups or hydrogenated starch hydrolysates and/or powders thereof may be produced by catalytic hydrogenation of standard glucose syrups (acid and/or enzyme converted) to the point where all the glucose end groups or the saccharides are reduced to alcohols, that is, dextrose to sorbitol. In the case of hydrogenated glucose syrups, the total solids contents will usually range from about 65 to about 80%, which solids are made of from about 4 to about 70%, and preferably about 4 to about 20% sorbitol, from about 8 to 65%, and preferably from about 20 to about 65% hydrogenated disaccharides (that is, maltitol), and 20 to 80% of the higher ($\geq$ tri to hepta) hydrogenated saccharides. The preferred of the hydrogenated starch hydrolysates contain from about 8 to about 45%, and preferably about 15 to 45%, tri-to hepta-hydrogenated saccharides, and from about 10 to about 35%, and preferably about 15 to 25%, hydrogenated saccharides higher than hepta.

The hydrogenated starch hydrolysate is also referred to in the literature as hydrogenated glucose syrup, or by the trademark or tradename Lycasin polyol or Lonza polyol. The term hydrogenated starch hydrolysate will be used herein to designate such material. The hydrogenated starch hydrolysate is usually sold commercially in the form of an aqueous solution thereof having a moisture content of about 20 to 35%.

The preferred L-aspartic acid derivative to be used in the compositions of the present invention is, as noted above, L-aspartyl-L-phenylalanine methyl ester, known as aspartame. Other L-aspartic acid sweetening derivatives may also be used. Such derivatives are disclosed in U.S. Pat. No. 3,995,000 at column 3, line 63 to column 4, line 35, the disclosure of which is incorporated herein by reference. The following description will be directed to aspartame with the understanding that the other L-aspartic acid sweetening derivatives may be used in lieu of and/or in addition to the aspartame. These compounds are also known as dipeptides.

The comestible products of the present invention are, preferably, sugarless products employing aspartame alone, or in combination with one or more other noncaloric sweetening agents. The compositions of the present invention contain amounts of water which, in the absence of the hydrogenated starch hydrolysate stabilizer of the present invention, would have a destabilizing effect on the aspartame used in such compositions. These destabilizing amounts of water will vary from product to product depending on the amount of aspartame being used and on the presence or absence of an adverse heat history for the product. The comestible products of the present invention, therefore, as contrasted to those made with some prior art technology, may have a relatively wide range of moisture contents, in the range of from about 0.5%, up to about 95% or more. Chewing gum products, for example, made according to the present invention may have a moisture content in the range of about 1 to 8% and preferably of about 3 to 7%, and beverages may have up to 95% or more of water, and other comestibles will have intermediate moisture contents.

The comestible products of the present invention may also include those having an adverse heat history, in combination with moisture. A deleterious heat history, in this regard, is a manufacturing heat history which in and of itself and/or in combination with moisture is adapted to cause or accelerate a decomposition of the aspartame during the storage of the comestible product in question after being subject to such manufacturing heat history. Such adverse heat history is one of at least 10 to 20 minutes at a temperature of 115° to 130° F. or more.

The comestible products of the present invention, may have a pH, either in the form of the product itself, or in the form of an aqueous extract thereof, in the range of about 5.0 to 7.0. Chewing gum products, made according to the present invention, for example, may have, as such, or as a water extract thereof, a pH in the range of about 4.9 to 7.4, and more preferably of about 6.4 to 6.8.

The comestible products of the present invention will have an aspartame content in the range of about 0.05 to 1.5, and preferably of about 0.1 to 0.3, and most preferably of about 0.20±0.05, percent by weight.

The stabilizing agent to be used with the aspartame is, as noted above, the hydrogenated starch hydrolysate. This stabilizer component of the compositions of the present invention is used in a stabilizingly effective amount which may vary depending on the amount of aspartame being used, the amount of moisture present in the composition, and the desired shelf life. This stabilizing amount is usually in the range of from >0 to about 30%, and preferably of about 5 to 20%, and most preferably, about 7 to 15%, by weight, on a wet basis, of the product in which the stabilizer is used. On a dry basis, the amount of the stabilizer to be used is usually in the range of from about >0 to about 21%, and preferably of about 3.5 to 18.5%, by weight of the total composition. The water content of the hydrogenated starch hydrolysate may be the primary source of the moisture present in the comestible products of the present invention, such as the chewing gum products.

The aspartame and hydrogenated starch hydrolysate are freely blended into the comestible products of the present invention without the need for keeping them separate and apart from each other or from any of the other components of such products during the manufacture and/or storage thereof, and prior to the consumption thereof by the user thereof.

Thus all of the moisture, L-aspartic acid sweetening agent and hydrogenated starch hydrolysate are each freely dispersed in the body of the comestible product. The moisture is not usually added as such but as a component of, for example, the hydrogenated starch hydrolysate, or the glycerine, or of one or more of the other components of the comestible product. Based on the findings of the present inventors there is no need to attempt to keep the moisture, L-aspartic acid sweetening agent and hydrogenated starch hydrolysate, in any form thereof, separate and apart from each other. Thus, there is no need to restrict the moisture content of the product to, say below 1 or 2%, nor is there any need to encapsulate, or otherwise modify in any way, nor to use any other means, to avoid having any of these components, in any freely formulated form thereof, from contacting any of other components. None of the formulated amount of the L-aspartic acid sweetening agent is sacrificed by the use of the stabilizing concept of the present invention. All of the formulated amount of the L-aspartic sweetening agent is taken into consideration in assessing the amount of recoverable L-aspartic acid sweetening agent provided in accordance with the teachings of the present invention.

The actual amounts of each of the aspartame and hydrogenated starch hydrolysate to be used in the various cosmestible products of the present invention will depend on the type of product, the amount of moisture therein, the heat history thereof and the desired level of aspartame usage desired. The amount of the hydrogenated starch hydrolysate used, preferably, should be adequate to provide for a recovery of at least 70% of the initial amount of the aspartame formulated into the product, after the product has been manufactured, packaged and stored, under accelerated storage conditions, for at least 24 days, and preferably at least 35 or more days. Based on experience it is believed that each day of accelerated storage, i.e., at 105° F. and at 30% relative humidity, is equivalent to about 7.0 to 7.5 days normal storage time for a product such as chewing gum in stick form. These tests thus indicate that the comestible products of the present invention would be storage stable under their normally encountered ambient storage conditions for at least 6, and preferably at least 9 to 12, months.

Based on the experience of the present inventors it has been found that when used according to the teachings of the present invention, and particularly in chewing gum products, aspartame can be stabilized against decomposition into decomposition products such as diketopiperazine for extended periods of shelf storage time to such an extent as to allow for the use, over the normal shelf life of such products, about 20 to 50%, and preferably about 30 to 40%, less of the aspartame that would be needed, in the absence of the hydrogenated starch hydrolysate stabilizer of the present invention, in order to provide for the desired levels of sweetness attainable from the aspartame during the course of such shelf life. The recoverable amounts of aspartame, as reported herein, are analytically determined by the high performance liquid chromatography method. From a commercial point of view the recovery of the aspartame is achieved in the mouth of the user of the comestible product in which it is employed.

The comestible products of the present invention include confectionary products such as chewing gum, including the regular non-bubble gum as well as the bubble gum types, hard candy, liquid filled chewing gum and candy; medicinals, such as cough drops, antacids, and breath fresheners; bakery goods such as cookies; and others such as dietetic pack fruits, preserves, jelly, salad dressing, syrups, puddings, ketsup, dry gelatin mixes, beverages, and dry beverage mixes.

The preferred of the comestible products of the present invention are chewing gum products.

The chewing gum compositions contemplated by the present invention comprise all types of sugar and sugarless chewing gums and chewing gum formulations known to those skilled in the art, including the regular gum and the bubble gum types. Typical chewing gum compositions comprise a chewing gum base, a modifier, a bulking agent or sweetener, and one or more other additives such as, flavoring agents, colorants and antioxidants. The modifying agents are used to soften, plasticize and/or compatibilize one or more of the components of the gum base and/or of the formulation as a whole.

A preferred softening agent for use in the chewing gum products of the present invention is glycerine, which may be used to provide soft, pliable products over extended shelf life conditions, see in this regard European Patent Application No. 82670 and International Patent Application No. WO84/01693. Unlike the compositions of such European and International Patent Applications, however, the compositions of the present invention need not be made under anhydrous conditions and they may contain moisture in amounts of more than the 1-2% moisture limits imposed by the technology of these other patent applications. The chewing gum compositions of the present invention may thus contain 0 to 30, and preferably about 5 to 15, and most preferably about 16 to 24 weight % of the glycerine, as a softening agent. The glycerine itself may contain about 1 to 5% moisture.

The chewing gum products of the present invention would have the following formulation:

| COMPONENT | WEIGHT % OF COMPONENT | |
|---|---|---|
| | BROAD RANGE | PREFERRED RANGE |
| gum base | 15 to 35 | 20 to 30 |
| gum base modifier other than glycerine | 0 to 5.0 | 0.3 to 3.0 |
| aspartame | 0.05 to 1.5 | 0.1 to 0.3 |
| moisture* | 2 to 6 | 3.5 to 5.0 |
| additional sweetener | 0 to 90 | 40 to 65 |
| coloring agent | 0.1 to 0.5 | 0.15 to 0.3 |
| flavoring agent | 0.5 to 2.5 | 0.18 to 1.2 |
| filler+ | 2 to 35 | 4 to 15 |
| glycerine | 0 to 30 | 5 to 15 |
| hydrogenated starch hydrolysate | >0 to 30** | 5 to 25** |
| Total | 100 | 100 |

*moisture content primarily from hydrogenated starch hydrolysate
**wet basis
+usually added as part of the gum base

GUM BASE

The composition of the gum base will vary depending on whether the gum base is to be used in a chewing gum product which is to be a regular, or non-bubble, gum product or a bubble gum product. For use in making a bubble gum or regular chewing gum product, the following gum base formulations may be used, in accordance with the present invention:

| | WEIGHT % OF COMPONENT IN GUM BASE FOR | | | |
|---|---|---|---|---|
| | BUBBLE GUM PRODUCT | | REGULAR GUM PRODUCT | |
| COMPONENT | Broad Range | Preferred Range | Broad Range | Preferred Range |
| masticatory material | 8-22 | 9-18 | 8-25 | 9-18 |
| plasticizer for masticatory material | 5-35 | 10-20 | 2-30 | 8-20 |
| hydrophillic detackifier | 0-30 | 4-10 | 5-35 | 10-25 |

| | WEIGHT % OF COMPONENT IN GUM BASE FOR | | | |
|---|---|---|---|---|
| | BUBBLE GUM PRODUCT | | REGULAR GUM PRODUCT | |
| COMPONENT | Broad Range | Preferred Range | Broad Range | Preferred Range |
| plasticizer for hydrophillic detackifier | 0–14 | 0–8 | 1–15 | 3–12 |
| oleaginous material | 3–15 | 5–10 | 4–20 | 8–15 |
| mineral filler | 1–35 | 10–20 | 5–35 | 15–30 |
| antioxidant | 0–0.1 | 0.05–0.09 | 0–0.1 | 0.03–0.09 |
| Total | | 100 | | 100 |

The masticatory substances are elastomeric materials which may be synthetic or natural in origin. The masticatory substances of synthetic origin would include styrene-butadiene copolymer, butyl rubber (which is isobutylene-isoprene copolymer) and polyisobutylene. The natural masticatory substances would include chicle, crown gum, nispero, balata, jelutong, pendare, perillo, niger gutta, tunu, leche caspi, sorva and gutta hank kang.

The plasticizer for the masticatory substance will preferably comprise a hydrogenated ester gum, that is a glycerol ester of hydrogenated resin and/or dimerized ester gum. However, other resins may be employed such as pentaerythritol ester gum, polymerized ester gum, polyterpene resin and ester gum.

The hydrophilic-type detackifier is a material which will absorb saliva and would include vinyl polymers having a molecular weight of at least 2000, and preferably of about 2000 to 80,000 or more, such as polyvinyl acetate, polyvinyl butyl ether and copolymers of vinyl esters and/or vinyl ethers with ethylene.

The plasticizers for the hydrophilic type detackifiers would include triacetin, acetylated glycerides and other flavor adjuvants such as ethyl acetate and triethyl citrate, and others as listed in U.S. Pat. No. 4,452,820 at Column 4, Lines 27 to 46, the disclosure of which is incorporated herein by reference.

The mineral fillers would include titanium dioxide, talc, alumina, tricalcium phosphate and mixtures thereof.

The oleaginous material includes waxes which are used primarily as compatibilizers/plasticizers between the elastomer and resin phases, where such two phases are employed. Examples of the waxes are petroleum waxes such as paraffin wax and microcrystalline wax; the polyethylene waxes; and natural waxes derived from either plant or animal sources such as candelilla wax, carnuba wax and bees wax. The oleginous material may also include hydrogenated vegetable or animal fats, cocoa butter or other softening-emulsifying agents such as phosphatides such as lecithin and di and tri-glycerides of fatty acids.

In addition, the gum base may include antioxidants such as butylated hydroxy toluene, butylated hydroxy anisole and propyl gallate.

The chewing gum compositions of the present invention can be sugar based or sugarless. The sugar or sugar substitute used in the compositions of this invention include natural sugars or non-sugar sweeteners. The amount of natural sugar which can be present in the final composition can range from about 0.5 to about 90 weight percent. The amount of non-sugar sweetener which can be used can range from 0 to about 2 weight percent of the final composition.

The term "natural sugar" includes one or more sugar containing materials, for example, monosaccharides of 5 to 6 carbon atoms, such as arabinose, xylose, or sorbose or mixtures of two or more of the foregoing monosaccharides; disaccharides such as sucrose, for example, cane or beet sugar including sucrose and dextrose, lactose, maltose or cellobiose; and polysaccharides such as dextrin, or corn syrup solids.

In addition, the dried higher polyhydricalcohols may be employed together with an artificial sweetener such as poorly water-soluble, as well as water-soluble, sweeteners, such as the free acid form of saccharin, sodium, calcium or ammonium saccharin salts, dihydrochalcones, glycyrrhizin, dipotassium glycyrrhizin, glycyrrhizic acid/ammonium salt, talin, acesulfame K, as well as *Stevia rebaudiana* (Stevioside), *Richardella dulcifica* (Miracle Berry), *Dioscoreophylim cumminisu* (Serendipity Berry), free cyclamic acid and cyclamate salts and the like or mixtures of any two or more of the above. The artificial sweetener may also be employed without any other sweetening agent.

In addition to the above, the chewing gum made by this invention can also contain conventional F. D. and C. and natural coloring agents.

The flavoring which can be included in the chewing gum compositions made in this invention can comprise peppermint oil, spearmint oil and mixtures thereof.

GENERAL PREPARATION OF CHEWING GUM PRODUCT

The chewing gum products of the present invention are prepared by first separately preparing the gum base. To then prepare either a sugar based or sugarless chewing gum formulation, the gum base for the product is melted, at a temperature about 190° to 250° F., and the other components of the composition are added thereto. The resulting composition is uniformly admixed. This takes about 3 to 7 minutes for commercial sized batches of these formulations. Each of the components is usually separately added to the formulated composition and uniformly mixed in before the next component is added. All of the admixing operations are conducted at temperatures in the range of about 115° to 185° F., and preferably of about 125° to 180° F. for a total mixing time, at such temperatures, of about 10 to 20 minutes. These operations do not have to be conducted under anhydrous conditions in preparing the compositions of the present invention, and any amounts of moisture that are normally present in the raw materials that are used in the compositions of the present invention do not usually have to be removed therefrom either prior to, or during, the formulating process. The one exception to this concept of not removing water occurs when using rubber latices as the source of the masticatory substance. As in prior art practice, the moisture content of the latex is, essentially, normally removed after coagulating the latex.

The chewing gum formulations disclosed herein may thus be prepared, and processed into chewing gum products, using conventional chewing gum formulation mixing, processing and packaging equipment and concepts.

The following examples are merely illustrative of the present invention and are not intended as a limitation upon the scope thereof.

PREPARATION OF CHEWING GUM COMPOSITIONS

Various chewing gum compositions were prepared using various of the gum bases prepared as described above. In preparing the chewing gum compositions they were prepared either in pilot plant sized batches or in commercial production sized batches in paddle mixers. In preparing each batch, the previously prepared gum base is melted at a temperature of up to about 245°±5° F. and is premixed with lecithin and color additive, and, optionally, the hydrogenated starch hydrolysate until the temperature drops to about 185° to 189° F. Then there is sequentially added powdered sorbitol), (at a temperature of 180° F.), liquid flavor (i.e. peppermint), liquid sorbitol, if used, glycerine, if used, alone or with the hydrogenated starch hydrolysate, if the latter is not premixed with the gum base, any additional flavorants, and finally the aspartame, and, optionally any other intense sweeteners. Each component is paddle mixed in before the next is added. Each mixing step takes about 0.5 to 5.0 minutes and the total mixing time is about 10-13 minutes. The resulting product is recovered and further processed and packaged using conventional chewing gum making procedures.

The hydrogenated starch hydrolysate used in the chewing gum compositions evaluated in the examples had a solids content of 75±1%, a monosaccharide content of about 6 to 8%, a disaccharide content of about 50 to 55%, and a higher saccharide content of about 38 to 48%. The higher saccharides were about 20 to 25% in the 3-7DP (degree of polymerization) range, and about 18 to 23% in the >7 DP range.

The liquid sorbitol employed had a solids content of about 70±1. The solid sorbitol is a high ($\geq$80%) gamma form having a M.P. of 99±2° C. The aspartame, when used at a 0.10 to 0.50 weight % formulation level, is usually admixed, proportionally, with about 10 to 50 pounds of the formulated amount of powdered sorbitol before being added to the mixing vessel. When being admixed in and further processed the aspartame in the compounded product is usually exposed to a heat history of up to about 120° to 140° F. for up to about 20 to 30 minutes.

Unless otherwise indicated, the $H_2O$ content* reported below for each of the chewing gum formulations of Examples 1 to 12 is a calculated amount based on the water content of the hydrogenated starch hydrolysate (HSH) and glycerine (where used) used in the respective formulations. The actual water content of these formulations is about 0.2 to 0.5% higher than the reported calculated values, since such additional amounts of water enter the final formulated product from the other components of the formulation and from the ambient atmosphere. The total of the reported weight %'s for the respective formulations of these Examples will thus total about 100% plus the respectively reported calculated water contents.

The test formulations were formed into chewing gum products as described above and then subjected to accelerated aging tests conducted at 105° F. and at 30° relative humidity. The recoverable aspartame contents of the test products were periodically determined analytically by high performance liquid chromatography (HPLC). Samples of each of the tested formulations were thus analyzed for recoverable aspartame (APM) contents first at zero time, i.e., within 48 hours after the product was first made, and prior to its being subjected to any accelerated aging, and then at various intervals, after 8 to 52 days or more of accelerated aging.

The test formulations were prepared using batch pilot plant or production plant procedures. The pilot plant procedures were used to make the products of Examples 1 to 12 and 21 to 26, and production plant procedures were used to make the products of Examples 13 to 20. These procedures are as follows:

The step wise pilot plant procedure used for the products of Examples 1 to 12 was as follows:

Prior to beginning the pilot plant batch making process, where glycerine is to be used in the formulation being employed, two separate glycerine/HSH batches are prepared, each of which contains one-half of each of the formulated amounts of the glycerine and the hydrogenated starch hydrolysate that are to be used in making the product of each example. One of such premixtures is then used in each of steps 4 and 7 as noted below.

If glycerine is not used the HSH is added in two equal increments, as noted below, in each of steps 4 and 7.

STEP—WISE PILOT PLANT PROCEDURE

1. Into a pre-warmed sigma bladed mixer add molten gum base. The gum base temperature is between 150°-200° F., and preferably between 170°-190° F.

2. With the blades of the mixer operating, and the temperature in the cited range, the lecithin is added and the mixing is continued for one minute.

3. Add ⅓ of the bulk sweetener (sorbitol powder) and mix for two minutes, or until homogeneous.

4. Add one of the glycerine/HSH premixtures or the first ½ of the HSH and mix for two minutes, or until homogeneous.

5. Add ⅓ of the sorbitol powder and continue mixing for two minutes.

6. The liquid flavor is then added and mixing is continued for one minute.

7. Add the second glycerine/HSH premixture, or the second ½ of the HSH and mix for two minutes.

8. Add the remaining ⅓ of the sorbitol powder and the aspartame. Prior to production of the batch, the aspartame is premixed with approximately ⅓ of the sorbitol powder. Continue mixing for two minutes, or until the batch is homogeneous. The final gum temperature is approximately 112° F.

9. The gum is removed from the mixer and conditioned at 70° F./ambient R.H prior to forming.

10. The gum is rolled and scored into a stick configuration. Mannitol is applied to the surface of the scored gum to prevent surface adhesion. The gum is then transferred into fin-seal foil pouches and sealed.

STEP—WISE PRODUCTION PLANT PROCEDURE

1. Into a pre-warmed sigma bladed mixer with the agitators on in the forward direction) meter in the required amount of molten gum base. After the addition of the gum base is complete, and the gum base temperature is 180° F. or less, add the lecithin. Mixing is continued for 7 minutes.

2. The aspartame is premixed with 50 # of sorbitol powder and stored separately until needed.

3. The full amount of the sorbitol powder is added to the mixer. Mixing is continued for 2 minutes.

4. The flavor is added after 30 seconds of mixing. Mixing continues for 2 minutes.

5. The full amount of HSH is added to the mixer. Mixing is continued for 3 minutes.

6. The aspartame/sorbitol powder mixture is added to the mixer. Mixing is continued for 2 minutes.

7. The completed gum batch is then transferred into hods and transported to an extruder where the gum is kneaded into ribbons, rolled to the correct thickness and scored into individual strips. The strips may then be conditioned up to 3 days (70° F./55% R.H.) before being scored into pieces. The pieces are dusted during the rolling operation with mannitol to prevent surface adhesion. The sticks of gum are then individually wrapped and packaged in accordance with standard practice in the industry.

In making control products in the production plant procedure an aqueous solution of sorbitol (68 to 69% solids content) is used in lieu of the HSH.

EXAMPLES 1–4

A series of four sugarless regular (non-bubble gum) chewing gum products were prepared using the pilot plant procedure described above the utilizing a gum base based on styrene-butadiene rubber. These formulations for these examples were so follows; in % by weight of each component thereof:

TABLE 1

| Example | 1 | 2 | 3 | 4 |
|---|---|---|---|---|
| Gum Base | 28.00 | | | |
| Sorbitol Powder | 46.73 | | | |
| HSH | 21.07 | 14.12 | 10.53 | 7.17 |
| Mannitol** | 2.00 | | | |
| Glycerine | 0 | 6.95 | 10.53 | 13.90 |
| Lecithin | 1.00 | | | |
| Flavor | 1.00 | | | |
| Aspartame | 0.20 | | | |
| Calculated* Water Content | 5.26 | 3.53 | 2.63 | 1.79 | dusting agent**

When subjected to the accelerated aging tests the products made from the test formulations of Examples 1–4 provided the following recoverable levels of APM:

TABLE 2

| | % APM Recovered, after indicated days of accelerated aging days: | | | |
|---|---|---|---|---|
| Examples | 0 | 7 | 21 | 35 |
| 1 | 95 | 90 | 81 | 83 |
| 2 | 87 | 87 | 78 | 71 |
| 3 | 90 | 85 | 76 | 68 |
| 4 | 85 | 86 | 74 | 66 |

These test results indicate the high recoverable levels of APM that can be obtained over extended periods of time with the products of the present invention. On the other hand, when regular chewing gum products are made under comparable conditions with the gum base of Examples 1–4 and with 0.1 to 0.3% APM and a water content of about 2 to 8%, but without hydrogenated starch hydrolysate, no more than about 55% of the formulated amount of the APM is still recoverable, under the accelerated aging test conditions, after about 33 days of such test conditions.

EXAMPLES 5–8

A series of four sugarless bubble gum chewing gum products were prepared using the pilot plant procedure described above and utilizing a gum base based on polyisobutylene rubber. These formulations for these products were as follows, in % by weight of each component thereof:

TABLE 3

| Example | 5 | 6 | 7 | 8 |
|---|---|---|---|---|
| Gum Base | 25.00 | | | |
| Plasticizer | 2.00 | | | |
| Sorbitol Powder | 47.50 | | | |
| HSH | 22.60 | 16.95 | 11.30 | 7.46 |
| Glycerine | 0 | 5.65 | 11.30 | 15.14 |
| Lecithin | 1.00 | | | |
| Flavor | 1.50 | | | |
| Artificial color | 0.20 | | | |
| Aspartame | 0.20 | | | |
| Calculated* Water Content | 5.65 | 4.24 | 2.82 | 1.87 |

When subjected to the accelerated aging tests the products made from the test formulations of Examples 5–8 provided the following recoverable levels of APM:

TABLE 4

| | % APM Recovered, after indicated days of accelerated aging days: | | |
|---|---|---|---|
| Example | 0 | 21 | 35 |
| 5 | 108* | 92 | 84 |
| 6 | 101* | 91 | 84 |
| 7 | 103* | 94 | 89 |
| 8 | 103* | 94 | 89 |

*The HPLC analytical test results for APM have a tolerance of up to about ±8%

These test results indicate the high recoverable levels of APM that can be obtained over extended periods of time with the products of the present invention. On the other hand, when bubble gum chewing gum products are made under comparable conditions with the gum base of Examples 5–8 and with 0.1 to 0.3% APM, and a water content of about 2 to 8%, but without hydrogenaed starch hydrolysate, no more than about 80% of the formulated amount of the APM is still recoverable, under the accelerated aging test conditions, after about 21 days under such test conditions. Based on experience it has been found that APM is less susceptible to decomposition in bubble gum based formulations flavored with artificial and natural mixed fruit flavors.

EXAMPLES 9–12

A series of four sugarless regular chewing gum products were prepared using the pilot plant procedure described above and utilizing a gum base based on styrene butadiene elastomer and containing about 22 to 30% polyvinylacetate.

These products of Examples 9–11 contained 0.48% $TiO_2$, and the product of Example 12 contained 0.6% $TiO_2$.

These formulations for these products were as follows; in % by weight of each component thereof.

TABLE 5

| Example | 9 | 10 | 11 | 12 |
|---|---|---|---|---|
| Gum Base | 24.00 | 24.00 | 24.00 | 28.00 |
| Sorbitol Powder | 59.90 | 52.90 | 44.90 | 54.75 |
| HSH | 7.00 | 14.00 | 22.00 | 15.00 |
| Glycerine | 7.00 | 7.00 | 7.00 | 0.00 |
| Flavor | 1.00 | 1.00 | 1.00 | 1.00 |
| Aspartame | 0.10 | 0.10 | 0.10 | 0.25 |
| Lecithin | 1.00 | 1.00 | 1.00 | 1.00 |
| Calculated* Water Content | 2.1 | 3.5 | 5.2 | 3.75 |
| pH+ | 5.6 | 5.6 | 5.9 | — |

When subjected to the accelerated aging tests the products made from the test formulations of Examples 9-12 provided the following recoverable levels of APM:

TABLE 6

| | % APM Recovered, after indicated days of accelerated aging days: | | | | |
|---|---|---|---|---|---|
| Example | 0 | 9 ± 2 | 15 | 20 ± 3 | 25 ± 1 | 34 |
| 9 | 83.5 | 95 | 93 | 87 | — | — |
| 10 | 95.5 | 89 | — | 87.8 | 80 | 81 |
| 11 | 95.1 | 89 | — | 89.8 | 86 | 82 |
| 12 | 94 | 95 | — | 90 | 93 | — |

These test results indicate the high recoverable levels of APM that can be obtained over extended periods of time with the products of the present invention. On the other hand, when regular bubble gum products are made under comparable conditions with the gum bases of Examples 9-12 and with 0.1 to 0.3% APM, and a water content of about 2 to 8%, but without hydrogenated starch hydrolysate, no more than about 70% of the formulated amount of the APM is still recoverable, under the accelerated aging test conditions, after only about 21 days under such test conditions.

EXAMPLES 13-20

A series of eight sugarless regular chewing gum products were prepared using the production plant procedure described above and utilizing a gum base based on styrene butadiene rubber.

The formulations for these products were as follows in % by weight of each component thereof:

TABLE 7

| Examples | 13 | 14 | 15 | 16 | 17 | 18 | 19 | 20 |
|---|---|---|---|---|---|---|---|---|
| Gum Base | 28.00 | 28.00 | 28.00 | 28.00 | 25.00 | 25.00 | 25.00 | 25.00 |
| Sorbitol powder | 46.90 | 46.80 | 46.70 | 46.80 | 58.75 | 58.85 | 58.75 | 53.75 |
| Sorbitol solution | 21.00 | 21.00 | 21.00 | 21.00 | 0.00 | 0.00 | 0.00 | 0.00 |
| HSH | 0.00 | 0.00 | 0.00 | 0.00 | 16.00 | 11.00 | 5.00 | 16.00 |
| Glycerine | 0.00 | 0.00 | 0.00 | 0.00 | 0.00 | 5.00 | 11.00 | 5.00 |
| Mannitol** | 2.00 | 2.00 | 2.00 | 2.00 | 2.00 | 2.00 | 2.00 | 2.00 |
| Lecithin | 1.00 | 1.00 | 1.00 | 1.00 | 1.00 | 1.00 | 1.00 | 1.00 |
| Flavor | 1.00 | 1.00 | 1.00 | 1.00 | 1.00 | 1.00 | 1.00 | 1.00 |
| Aspartame | 0.10 | 0.10 | 0.20 | 0.20 | 0.15 | 0.15 | 0.15 | 0.15 |
| Na. Saccharin | 0.00 | 0.10 | 0.10 | 0.00 | 0.10 | 0.00 | 0.10 | 0.10 |
| Calculated* water content | 6.63 | 6.63 | 6.63 | 6.63 | 4.00 | 2.75 | 1.25 | 4.00 | dusting agent**

When subjected to the accelerated aging tests the products made from the test formulations of Examples 13-20 provided the following recoverable levels of APM:

TABLE 8

| | % APM Recovered after Indicated days of accelerated aging days: | | | |
|---|---|---|---|---|
| Example | 0 | 13 | 20.0 ± 2 | 28 |
| 13 | 97 | 69 | 56.1 | 44 |
| 14 | 86 | 54 | 47.8 | 30 |
| 15 | 87 | 63 | 52.6 | — |
| 16 | 84.6 | — | 51.2 | 38 |
| 17 | 90.3 | — | 72.1 | 63 |
| 18 | 96.6 | — | 74.4 | 62 |
| 19 | 89.3 | — | 68.1 | 56 |
| 20 | 94.6 | — | 71.8 | 61 |

TABLE 9

| | % APM Recovered after Indicated Days of Ambient Storage at 22° C., 50% RH days: | | | | | | |
|---|---|---|---|---|---|---|---|
| Example | 0 | 76 | 90 | 97 | 105 | 142 | 142+ |
| 13 | 97 | 74 | — | 64 | 64 | — | 165/56 |
| 14 | 86 | 64 | — | 54 | 53 | — | 165/48 |
| 15 | 87 | 68 | — | — | 60 | — | 240/49 |
| 16 | 85 | — | 57 | 57 | — | — | 217/43 |
| 17 | 90 | — | 80 | — | — | 72 | — |
| 18 | 97 | — | 81 | — | — | 75 | — |
| 19 | 89 | — | 72 | — | — | 68 | — |
| 20 | 95 | — | 77 | — | — | 72 | — |

The test results of Examples 13 to 20 as shown in Tables 8 and 9 indicate that the use of HSH substantially improves the storage stability of APM when HSH is used as a stabilizer therefor.

The 142+ days for Examples 13 to 16 indicates that the last test for recovered APM for these samples was conducted on the 165th, 165th, 240th and 217th day, respectively, of ambient storage, and provided recovered APM%'s of 56, 48, 49 and 43 respectively.

EXAMPLES 21-26

A series of six sugarless regular (non-bubble gum) chewing gum products were prepared using the pilot plant procedure described above and utilizing a gum base based on styrene-butadiene rubber. These formulations for these examples were as follows; in % by weight of each component thereof:

TABLE 10

| Example | 21 | 22 | 23 | 24 | 25 | 26 |
|---|---|---|---|---|---|---|
| Gum base | 28.00 | 28.00 | 28.00 | 28.00 | 28.00 | 28.00 |
| Sorbitol Powder | 41.80 | 37.80 | 46.80 | 46.80 | 46.80 | 41.80 |
| Sorbitol solution | — | — | 18.00 | 16.00 | 13.00 | 21.00 |
| HSH | 15.00 | 25.00 | — | — | — | — |
| glycerine | 11.0 | 5.0 | 3.00 | 5.00 | 8.0 | 5.00 |
| Mannitol | 2.00 | 2.00 | 2.00 | 2.00 | 2.00 | 2.00 |
| lecithin | 1.00 | 1.00 | 1.00 | 1.00 | 1.00 | 1.00 |
| Flavor | 1.00 | 1.00 | 1.00 | 1.00 | 1.00 | 1.00 |
| aspartame | 0.20 | 0.20 | 0.20 | 0.20 | 0.20 | 0.20 |
| calculated* water content | 3.75 | 6.25 | 5.7 | 5.0 | 4.1 | 6.6 |

When subjected to the accelerated aging tests the products made from the text formulations of Examples 21 to 26 provided the following recoverable levels of APM:

TABLE 11

| | % APM Recovered, After Indicated Days of Accelerated Aging days: | | |
|---|---|---|---|
| Examples | 0 | 7 | 28 |
| 21 | 96 | 92 | 79 |

TABLE 11-continued

| | % APM Recovered, After Indicated Days of Accelerated Aging days: | | |
|---|---|---|---|
| Examples | 0 | 7 | 28 |
| 22 | 89.5 | 89 | 75 |
| 23 | 85.5 | 79 | 49.3 |
| 24 | 97 | 85 | 52 |
| 25 | 97 | 87 | 56.8 |
| 26 | 95 | 82.5 | 45.8 |

The test results of Examples 21 and 22 indicate that high recoverable levels of APM can be obtained over extended periods of time with the products of the present invention, which contain HSH. On the other hand Examples 23 to 26 indicate that the use of liquid sorbitol, in lieu of HSH, does not provide compositions in which the APM is very stable over long periods of time.

What is claimed is:

1. A comestible composition comprising an admixture of
   at least 1.0% moisture,
   a formulated amount of unencapsulated L-aspartic acid sweetening agent and
   an aqueous solution of hydrogenated starch hydrolysate,
   wherein the aqueous solution of hydrogenated starch hydrolyssate is in amounts effective to stabilize said L-aspartic acid sweetener when said comestible composition is stored at 30° relative humidity and 105° F. for at least 24 days so that at least 70% of the original formulated amount of said L-aspartic acid sweetening agent is recoverable,
   said formulated amount of said L-aspartic sweetening agent being about 20 to 50% less than the amount of said L-aspartic acid sweetening agent which would have been needed to recover an equal percentage of L-aspartic acid sweetener in the absence of the aqueous hydrogenated starch hydrolysate stabilizer,
   and said percents being weight percents based on the total weight percent of said comestible composition.

2. A comestible composition as in claim 1 which is a chewing gum composition.

3. A comestible composition as in claim 2 in which said L-aspartic acid sweetening agent is aspartame.

4. A comestible composition as in claim 3 further having a heat history of at least 115° F. for at least 10 minutes, and a moisture content of about 2 to 8%, an aspartame content of about 0.1 to 0.3%, and a hydrogenated starch hydrolysate solution content of >0 to about 30%.

5. A comestible composition as in claim 4 further comprising ≧0 to 30% of glycerine.

6. A comestible composition as in claim 5 further comprising the following additional components,

| 15 to 35% | gum base |
| 0 to 5.0% | gum base modifier |
| 0 to 90% | additional sweetening agent |
| 0.1 to 0.5% | coloring agent |
| 0.5 to 2.5% | flavoring agent |
| 2 to 35% | filler. |

7. A comestible composition having a heat history of at least 115° F. for at least 10 minutes and comprising an admixture of
   a formulated, and at least partially sweetening, amount of at least one unencapsulated L-aspartic acid sweetening agent,
   moisture in an amount of at least 1.0%, which amount of moisture is such as to deleteriously effect said L-aspartic acid sweetening agent during the normal storage of said comestible composition in the absence of a stabilizer for said L-aspartic acid sweetening agent, and
   as a stabilizer for said L-aspartic acid sweetening agent, >0 to about 30 weight % of an aqueous solution of hydrogenated starch hydrolysate, which amount of said stabilizer is effective to stabilize said L-aspartic acid sweetening agent when said comestible composition is stored for at least 24 days at 30° relative humidity and 105° F. so as to retard or prevent the decomposition of said L-aspartic acid sweetening agent into decomposition products which are devoid of sweetening characteristics to such extent as to allow for the recovery of at least 70% of said formulated amount of said L-aspartic acid sweetening agent after said storage.

8. A comestible composition as in claim 7 comprising at least 2 weight % moisture.

9. A comestible composition as in claim 8 in which said L-aspartic acid sweetening agent comprises aspartame.

10. A comestible composition as in claim 9 in which said composition further comprises ≧0 to 30 weight % glycerine.

11. A comestible composition as in claim 10 in which said stabilizer comprises about 5 to 25 weight % of said hydrogenated starch hydrolysate.

12. A comestible composition as in claim 8 which is a chewing gum composition.

13. A comestible composition comprising an admixture of
   a formulated, and at least partially sweetening, amount of at least one unencapsulated L-aspartic acid sweetening agent,
   moisture in such amounts as to cause or accelerate the decomposition of said L-aspartic acid sweetening agent into decomposition products which are devoid of sweetening characteristics during the normal storage of said comestible composition for at least six months in the absence of a stabilizer for said L-aspartic acid sweetening agent, and
   as a stabilizer for said L-aspartic acid sweetening agent, stabilizingly effective amounts of an aqueous solution of hydrogenated starch hydrolysate, said amounts of said stabilizer being effective to such extent as to allow for the recovery of at least 70% of said formulated amount of said L-aspartic acid sweetening agent after said storage.

14. A comestible composition as in claim 13 comprising at least 1.0 weight % moisture.

15. A comestible composition as in claim 14 in which said L-aspartic acid sweetening agent comprises aspartame.

16. A comestible composition as in claim 15 which is a chewing gum composition.

17. A comestible composition as in claim 16 in which said stabilizer comprises, on a wet basis, >0 to 30 weight % glycerine and >0 to 30 weght % of said hydrogenated starch hydrolysate.

18. In a process for preparing and storing a comestible composition which is an admixture comprising a formulated, and at least partially sweetening, amount of at least one unencapsulated L-aspartic acid sweetening agent said composition further having a moisture content and/or a heat history which, upon the normal commercial storage of said composition in the absence of a stabilizer for said L-aspartic acid sweetening agent, would cause or accelerate the decomposition of said formulated amount of said L-aspartic acid sweetening agent into decomposition products which are devoid of sweetening characteristics, the improvement which comprises further admixing into and formulating said comestible composition with, as a stabilizer for said L-aspartic acid sweetening agent, on a wet basis, >0 to about 30% of an aqueous solution of hydrogenated starch hydrolysate, said formulated amount of said L-aspartic acid sweetening agent being 20 to 50% or less than the amount thereof which would have been needed to recover an equal percentage of L-aspartic acid sweetening agent in the absence of said aqueous hydrogenated starch hydrolysate stabilizer, said percents being weight percents based on the total weight percent of said comestible composition, and storing said comestible composition and recovering at least 70% of said formulated amount of L-aspartic acid sweetening agent after storage for at least six months.

19. A process as in claim 18 in which said L-aspartic acid sweetening agent is aspartame.

20. A process as in claim 19 in which $\geq 0$ to 30 weight % of glycerine is employed in said composition.

21. A process as in claim 20 in which about 5 to 15 weight % of said hydrogenated starch hydrolysate is employed.

22. A process as in claim 21 in which said comestible composition is a chewing gum composition.

23. In a process for preparing and storing a comestible composition which is an admixture comprising a formulated, and at least partially sweetening, amount of at least one unencapsulated L-aspartic acid sweetening agent said composition further having a moisture content and/or a heat history which, upon the normal commercial storage of said composition in the absence of a stabilizer for said L-aspartic acid sweetening agent, would cause or accelerate the decomposition of said formulated amount of said L-aspartic acid sweetening agent into decomposition products which are devoid of sweetening characteristics, the improvement which comprises further admixing into and formulating said comestible composition with, as a stabilizer for said L-aspartic acid sweetening agent, an aqueous solution of hydrogenated starch hydrolysate in such amounts as to stabilize said L-aspartic acid sweetening agent so as to allow for the recovery from said comestible composition of at least 70% of said formulated amount of L-aspartic sacid sweetening agent after the normal commercial storage of said comestible composition for at least six months.

24. A process as in claim 23 in which said L-aspartic acid sweetening agent is aspartame.

25. A process as in claim 24 in which the formulated amount of said aspartame is about 0.05 to 1.5 weight %.

26. A comestible composition as in claim 1 which has been stored for at least 35 days.

27. A comestible composition as in claim 2 which has been stored for at least 35 days.

28. In a process for sweetening a comestible product having a moisture content of $\geq 1.0\%$ with, at least in part, unencapsulated aspartame at a formulated level of >0 to 1.5% of said aspartame while stabilizing said aspartame against the destabilizing effects of said moisture during the normal commercial storage of said comestible composition, the improvement which comprises
further admixing into and formulating said comestible product with aqueous hydrogenated starch hydrolysate in such amounts as to stabilize said aspartame against said destabilizing effects of said moisture so as to provide for the recovery of at least 70% of said formulated amount of aspartame after said comestible product has been subject to ambient commercial storage conditions for at least six months, said formulated amount of L-aspartic acid sweetening agent being 20 to 50% less than the amount thereof which would have been needed to recover an equal percentage of said L-aspartic acid sweetener agent in the absence of said aqueous hydrogenated starch hydrolysate stabilizer, all of said percents being weight percents based on the total weight percent of said comestible composition.

29. A process as in claim 28 in which said aspartame is stabilized so as to allow for the recovery of at least 80% of said formulated amount of aspartame after said 6 months of ambient commercial storage.

30. A process as in claim 28 in which said aspartame is stabilized so as to allow for the recovery of at least 70% of said formulated amount of aspartame after at least 9 months of ambient commercial storage.

31. A process as in claim 28 in which said comestible product contains more than 2% water and the formulated amount of aspartame is 0.20±0.05%.

32. A process as in claim 31 in which said comestible product is chewing gum.

33. A process for reducing the amount of unencapsulated aspartame needed to be formulated into a comestible product which is at least partially sweetened therewith and which also contains aspartame destabilizing amounts of water and is devoid of a stabilizer for said aspartame, and while still providing for a recoverable aspartame content of X% after the ambient commercial storage of said comestible product for at least six months, said X% being at least 70% of the reduced amount of said aspartame to be formulated into said comestible product, which comprises formulating said comestible product with an amount of aspartame which is about 20 to 50% less than the amount of aspartame which would have been needed in said comestible product, in the absence of a stabilizer for said aspartame, to provide for a recoverable level of $\geq X\%$ of aspartame after said storage period, and with, as a stabilizer for such reduced amount of aspartame, an aqueous solution of hydrogenated starch hydrolysate in such amounts as to effectively stabilize said aspartame and provide for a recoverable aspartame content of $\geq X\%$ after said storage period, said percents being weight percents based on the total weight of said comestible product.

34. A process as in claim 33 in which said comestible product contains at least 1.0% water and 0.05 to 1.5% aspartame.

35. A process as in claim 34 in which said comestible product is chewing gum.

36. A comestible product which has been subjected to at least six months ambient commercial storage conditions and which when formulated comprised an admixture of
  more than 2% moisture,
  a sweetening amount of unencapsulsated aspartame, and
  an aqueous solution of hydrogenated starch hydrolysate in an amount effective to stabilize said sweetening amount of aspartame so as to provide for the recovery of at least 70% of said sweetening amount of aspartame under said storage conditions.

37. A comestible product as in claim 36 which has a recoverable aspartame content which is at least 80% of said sweetening amount.

38. A comestible product as in claim 36 which has been subjected to at least 9 months ambient commercial storage conditions.

39. A comestible product as in claim 36 which is chewing gum.

40. A comestible composition comprising an admixture of
  (i) at least 1.0 weight % moisture,
  (ii) about 0.05 to 1.0 weight % of unencapsulsated L-aspartic acid sweetening agent,
and
  (iii) an aqueous solution of hydrogenated starch hydrolysate
and wherein the aqueous solution of hydrogenated starch hydrolysate is in amounts effective to stabilize said L-aspartic acid sweetening agent when said comestible composition is stored at 30° relative humidity and 105° F. for at least 24 days so that at least 70% of said (ii) amount of L-aspartic acid sweetening agent is then recoverable.

41. A comestible composition as in claim 40 which is a chewing gum composition.

42. A comestible composition as in claim 41 in which said L-aspartic acid sweetening agent is aspartame.

43. A comestible composition as in claim 42 having a moisture content of about 2 to 8%, an aspartame content of about 0.2±0.05%, and a hydrogenated starch hydrolysate content of $\geq 0$ to about 30 weight %.

44. A comestible composition as in claim 43 further comprising $\geq 0$ to 30 weight % glycerine.

45. A comestible composition as in claim 43 further having a manufacturing heat history of at least 115° F. for at least 10 to 20 minutes.

46. A comestible composition as in claim 43 further comprising the following additional components,

| | |
|---|---|
| 15 to 35% | gum base |
| 0 to 5.0% | gum base modifier |
| 0 to 90% | additional sweetening agent |
| 0.1 to 0.5% | coloring agent |
| 0.5 to 2.5% | flavoring agent |
| 2 to 35% | filler |

47. A comestible composition as in claim 46 capable of retaining at least 60% of said L-aspartic acid sweetening agent therein for at least 35 days.

48. A comestible composition as in claim 46 capable of retaining at least 80% of said L-aspartic acid sweetening agent therein for at least 35 days.

* * * * *